C. H. Field,
Engraving Machine,
N°66,819,
Patented July 16, 1867.
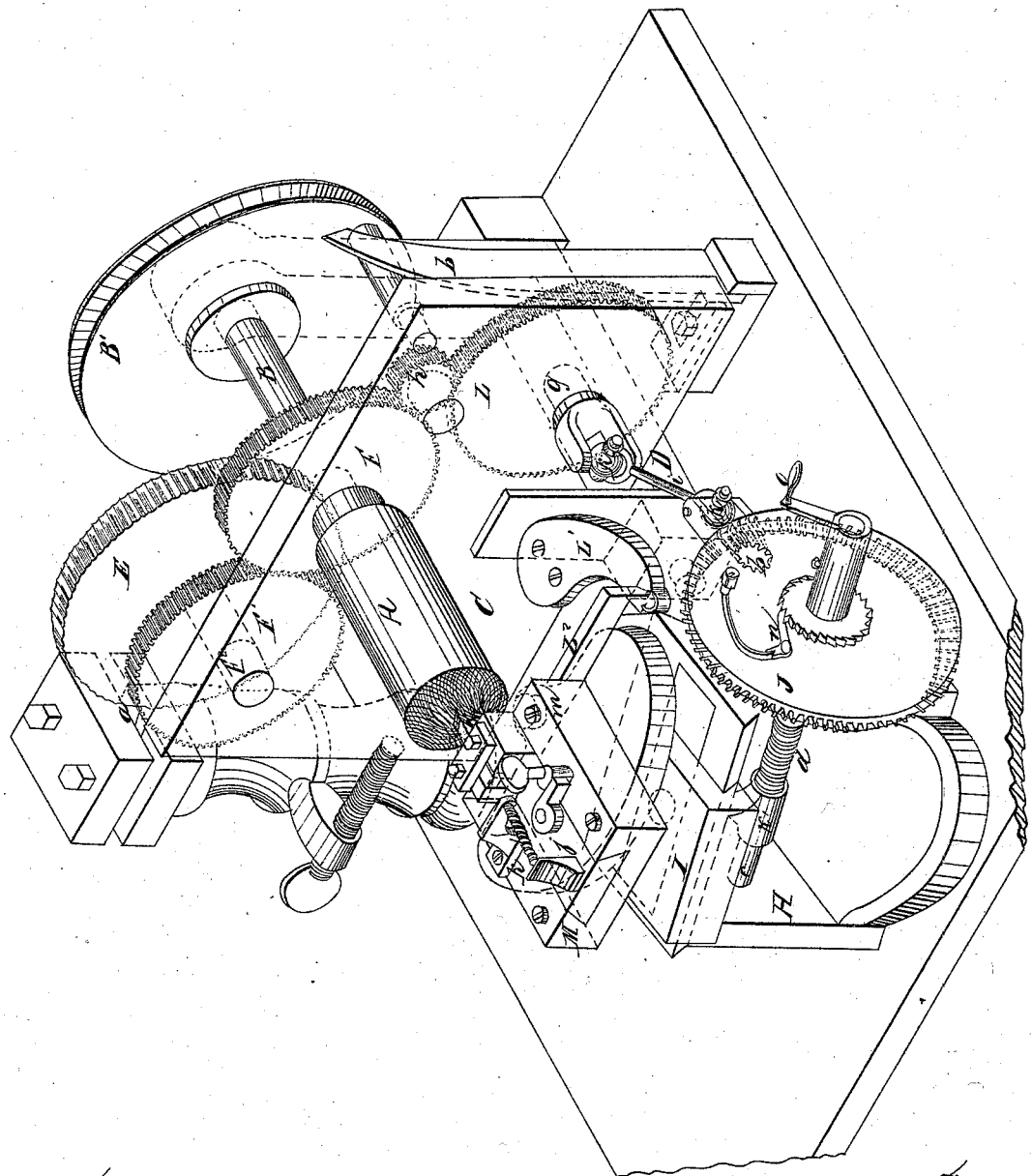
Witnesses:
Benj T Thurston
William W Rickard
Inventor:
Charles H Field.

United States Patent Office.

CHARLES H. FIELD, OF PROVIDENCE, RHODE ISLAND.

Letters Patent No. 66,819, dated July 16, 1867.

ROSETTE ENGINE.

*The Schedule referred to in these Letters Patent and making part of the same.*

TO ALL WHOM IT MAY CONCERN:

Be it known that I, CHARLES H. FIELD, of the city and county of Providence, in the State of Rhode Island, have invented certain new and useful improvements in Rosette Engines; and I do hereby declare that the following specification, taken in connection with the drawings-making a part of the same, is a full, clear, and exact description thereof. The drawing exhibits the machine in perspective.

The machine herein described is particularly adapted to engrave the "barley-corns" upon the backs of watch and locket-cases; but with slight modifications of structure it can be applied to ornament other articles, as, for example, the sides of cups and silversmiths' manufactures generally.

A is the holding-block, upon the end of which is secured by cement the watch-back or similar article to be engraved. This holding-block is fitted to be secured upon the spindle B, which is made to revolve, by means of the pulley $B^1$, keyed to the same, or by other convenient means. The spindle B has its bearings in the frame C, which is supported upon the transverse rocker-shaft D, and is capable of receiving an oscillating movement from the influence of the rosette-wheel E, as will presently be seen. Upon the spindle B is keyed a toothed wheel, F, the teeth of which engage with the teeth of the toothed wheel $F^1$, which is secured to the shaft $F^2$, upon which the rosette-wheel is to be mounted. The rosette-wheel E has its periphery fluted in this instance with eighty scores, and against the face of the wheel bears a fixed tooth or detent, $a$, which is made adjustable. Against the end of the frame C, opposite to the end at which the tooth $a$ is applied, or in any other convenient location, is made to bear a spring, $b$, the tendency of which is to keep the frame C in a position that will cause the scores of the rosette-wheel to remain in contact with the face of the fixed tooth $a$. It is quite evident from the description that as motion is given to the spindle B, the rosette-wheel G will be revolved, and its fluted periphery being made to travel over the surface of the end of the fixed tooth $a$, an oscillating movement, depending upon the shape of the scores in the periphery of the rosette wheel, will be given to the frame C, and, necessarily, if a fixed graver be held against a watch-back upon the holding-block, the line traced by it will be a wave line, or a line whose character will be determined by the true circular movement of the holding-block, modified by the oscillating movement of the frame in which the spindle which carries such holding-block is mounted. In this instance, as the rosette-wheel is provided with eighty scores, the toothed wheel $F^1$ is furnished with one hundred and sixty-one teeth, while the wheel F, which engages therewith, has only one hundred and sixty teeth. The purpose of this will presently be understood.

In front of the frame C is placed the mechanism which supports and controls the movement of the engraving tool. It consists of a frame, H, which is capable of turning upon a pivot. Through the frame from side to side passes a shaft, $c$, upon which is a leading-screw, $d$. $H'$ is a nut fitting this leading-screw, and a part of a perpendicular neck-piece, which projects from the under side of a traversing-block, I, which supports the tool-post carriage. Upon the end of the shaft $c$ is placed the bevelled-toothed wheel J, held fast by a stop-dog on such wheel, and a ratchet upon the shaft $c$, from moving in one direction without also imparting motion to the shaft $c$, and its leading-screw $d$, in a well-understood way. This bevelled wheel J, so connected with the leading-screw $d$, is connected with the oscillating frame C by means of a double universal joint-connection, K, uniting the axle which carries the bevelled driving-pinion $f$ with the axle $g$ in the frame C. A revolving motion is given to the axle $g$, as the spindle B is revolved by the toothed wheel F, acting through the intermediate pinion $h$, upon the toothed wheel L, keyed to the axle $g$. The link $i$, between the double joints, is made with a telescopic joint, or with the spindle of one part fitted to slide within the hollow spindle of the other part, and with a groove and feather connection, so that the length of the link may be accommodated to the relative positions of the oscillating frame C and the frame H which supports the tool-post. The tool-post which sustains the graver is arranged upon a sliding-block, $j$, which is kept in such position that the edge of the graver will bear upon the watch-back by the constant pressure of a spring, $k$. The whole bed-piece M of the tool-post rests upon the traversing-block I, and is fitted to turn around a fixed pivot, $m$. $L^1$ is a "former" or pattern-block, which corresponds in outline with the domed face of the article to be engraved; and the movement of the tool-post bed around its pivot $m$, as the machine is performing its work, is governed by the pattern-block M, by means of the arm $L^2$ projecting from the tool-post bed, upon the end of which is a friction-roller, said roller being kept up to the face of the pattern by the force of a spring or the gravity of a weight, acting through a cord passing over a pulley in a post, the end of such cord being made fast to the end of the arm $L^2$.

From the foregoing description of the machine it is evident that if the graver be set at the centre of the watch-back or other article affixed to the end of the holding-block A, and the machine be put into action, there will be described a convolute line, made up of waves, and expanding from the centre to the outer edge of the article; and inasmuch as these waves are obtained from the rocking of the frame C, induced by the scores in the rosette-wheel; and as there is one more tooth in the wheel $F^1$ than in the wheel F, it follows that for every complete revolution of the spindle B, there will be one revolution of the rosette-wheel, less the space occupied by one tooth in the wheel $F^1$, and this will so change the relation of the curves of each convolution with reference to the curves of the next preceding convolution as to produce to the eye the "barley-corn" effect desired.

The capacities of this machine are not limited to the production of the "barley-corn" figure; but other figures of a similar character can be produced by the alteration of the conformation of the rosette, and by a corresponding alteration in the size of the tooth-wheels F and $F^1$. So, also, the same principle can be applied for ornamenting the surfaces of cups or other similar articles by a simple change of arrangement, consisting only of giving vibrating movement longitudinally to the holding-block from the influence of the rosette-wheel, and applying the graver to the side of such article. After the article has been engraved the tool can be brought back to position, to commence upon a new piece, by simply raising the pawl $n$, and, by means of the crank $o$, turning backward the leading-screw $d$.

What I claim as my invention, and desire to secure by Letters Patent, is—

1. Combining the rocking-frame C with the mechanism which operates the graver, substantially as described.

2. Combining the rosette-wheel or pattern with the spindle which gives motion to the holding-block by the toothed wheels F and $F^1$ of different dimensions, substantially as described for the purposes specified.

3. Combining the carriage which carries the graver with a pattern-block, $L^1$, substantially as described for the purposes specified.

CHARLES H. FIELD.

Witnesses:
 BENJ. F. THURSTON,
 WM. W. RICKARD.